(12) United States Patent
Fishman et al.

(10) Patent No.: US 6,859,306 B2
(45) Date of Patent: Feb. 22, 2005

(54) METHOD, APPARATUS AND SYSTEM FOR REDUCING GAIN RIPPLE IN A RAMAN-AMPLIFIED WDM SYSTEM

(75) Inventors: Daniel A. Fishman, Lakewood, NJ (US); Stefan Hunsche, Sunnyvale, CA (US); Xiang Liu, Marlboro, NJ (US); Mahan Movassaghi, Middletown, NJ (US); Chunhui Xu, Ithaca, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 36 days.

(21) Appl. No.: 10/357,646

(22) Filed: Feb. 4, 2003

(65) Prior Publication Data

US 2004/0150875 A1 Aug. 5, 2004

(51) Int. Cl.[7] ................................................ H01S 3/00
(52) U.S. Cl. ................ 359/334; 359/341.41; 359/337.4
(58) Field of Search ........................................ 359/334

(56) References Cited

U.S. PATENT DOCUMENTS

| | | | |
|---|---|---|---|
| 6,532,101 B2 * | 3/2003 | Islam et al. ................... | 359/334 |
| 6,674,567 B2 * | 1/2004 | Ohtani et al. ................. | 359/334 |
| 6,674,568 B2 * | 1/2004 | Liu .............................. | 359/334 |
| 6,690,504 B1 * | 2/2004 | Nagel et al. .................. | 359/334 |
| 6,697,187 B2 * | 2/2004 | Seydnejad et al. ............ | 359/334 |
| 6,704,134 B2 * | 3/2004 | Yokoyama .................... | 359/334 |
| 2002/0186456 A1 * | 12/2002 | Inoue et al. .................. | 359/334 |
| 2002/0191903 A1 * | 12/2002 | Neuhauser .................... | 385/24 |
| 2003/0067669 A1 * | 4/2003 | Sekiya ......................... | 359/334 |
| 2003/0099030 A1 * | 5/2003 | Kumasako et al. ........... | 359/334 |
| 2003/0137720 A1 * | 7/2003 | Onaka et al. ................. | 359/334 |
| 2003/0174387 A1 * | 9/2003 | Eggleton et al. ............. | 359/334 |

* cited by examiner

*Primary Examiner*—Mark Hellner
*Assistant Examiner*—Deandra M. Hughes

(57) ABSTRACT

A method, apparatus and system for reducing gain ripple in a Raman-amplified WDM system includes determining a gain profile of an optical signal transported via a first Raman amplification span in a Raman-amplified WDM system, comparing the determined gain profile to a gain profile of an optical signal transported via a second Raman amplification span, determining, from the comparison, an amount of wavelength adjustment required for a plurality of Raman pumps comprising at least one Raman pump block of the second Raman amplification span to alter the gain profile of an optical signal transported via the second Raman amplification span, such that a cumulative gain profile of an optical signal transported via the first and the second Raman amplification spans approaches a desired gain profile, and generating a control signal suitable for adjusting the wavelengths of the plurality of Raman pumps of the at least one Raman pump block an amount consistent with the determined amount.

29 Claims, 6 Drawing Sheets

METHOD, APPARATUS AND SYSTEM FOR REDUCING GAIN RIPPLE IN A RAMAN-AMPLIFIED WDM SYSTEM

FIELD OF THE INVENTION

This invention relates to the field of optical communications and, more specifically, to Raman-pumped WDM systems.

BACKGROUND OF THE INVENTION

The demand for communication systems with higher capacities has pushed the common design approaches of wavelength-division-multiplexed (WDM) systems to their limits. A typical configuration of a point-to-point WDM system includes a number of optical transmitters, an optical multiplexer, spans of transmission fiber, optical amplifiers (usually erbium-doped fiber amplifiers, EDFAs), dispersion compensating devices, an optical demultiplexer and a number of optical receivers. Unfortunately, the usable gain bandwidth for the optical amplifiers currently used, for example the EDFAs, is limited and not very broad, and the distortion of the signal does not allow for transmission over very long optical transmission links. This has led to the investigation of alternate methods for amplification with greater broadband capabilities that allow for longer spacing in-between amplification and longer transmission distances.

The use of Raman amplification has been proposed and demonstrated for compensating losses in all-optical transmission systems. Raman amplification is achieved by launching high-power pump waves into a silica fiber at a wavelength lower than the signal to be amplified. Amplification occurs when the pump wavelength gives up its energy to create new photons at the signal wavelength. Since there is a wide range of vibrational states above the ground state, a broad range of transitions may provide gain, of which, typically, 48 nm is usable gain. Raman gain increases almost linearly within the wavelength offset between the pump wavelength and the signal wavelength, peaking at a distance of typically 100 nm and then dropping off rapidly with increased offset. Ultra-broad Raman gain bandwidth can be achieved by combining the Raman amplification effect of multiple pump waves selected carefully for the wavelength domain. See, for example, H. Kidorf, K. Rottwitt, M. Nissov, M. Ma, and E. Rabarijaona, "Pump interactions in a 100-nm bandwidth Raman amplifier," IEEE Photonics Tech. Lett. 11, 530, 1999. Additionally, the positions of the gain bandwidth within the wavelength domain of each pump can be adjusted by tuning the pump wavelength. Compared to commonly used erbium-doped fiber amplifiers (EDFAs), Raman amplifiers exhibit several fundamental advantages such as low noise, fixed gain profiles which are independent of signal and pump levels; they are also operable in a plurality of signal bands since Raman gain peak changes with pump wavelength.

Despite all of its advantages, there are some degradation effects related to Raman-pumped WDM systems. For example, when using a plurality of Raman pumps with varied wavelengths as a collective Raman pump to pump an amplification fiber, the different pump wavelengths of the collective Raman pump generate gain curves having different gain maxima. These gain curves, when combined, thereby create an uneven gain profile. This uneven gain profile is referred to as containing gain ripple. After concatenations of several Raman amplification spans, the gain ripple can accumulate and ultimately limit system performance. In addition, power fluctuations in time within the plurality of Raman pumps, which is so often the case, may also lead to amplified fluctuations and gain ripple, which also degrades system performance.

In current Raman-pumped systems, to correct for gain ripple from span to span, dynamic gain equalizing filters (DGEFs) are implemented in each span to increase the gain flatness. Unfortunately, DGEFs are costly devices and introduce excess loss that needs to be compensated for by adding optical amplifiers to each span further increasing the cost and complexity of a system.

SUMMARY OF THE INVENTION

The invention comprises a method, apparatus and system for reducing gain ripple in concatenated spans of a Raman-amplified WDM system.

In one embodiment of the present invention, a method for reducing gain ripple in a Raman-amplified WDM system includes determining a gain profile of an optical signal transported via a first Raman amplification span in a Raman-amplified WDM system, comparing the determined gain profile to a gain profile of an optical signal transported via a second Raman amplification span, determining, from the comparison, an amount of wavelength adjustment required for a plurality of Raman pumps comprising at least one Raman pump block of the second Raman amplification span to alter the gain profile of an optical signal transported via the second Raman amplification span, such that a cumulative gain profile of an optical signal transported via the first and the second Raman amplification spans approaches a desired gain profile, and generating a control signal suitable for adjusting the wavelengths of the plurality of Raman pumps of the at least one Raman pump block an amount consistent with the determined amount.

Alternatively, the method further includes adjusting, substantially simultaneously, the wavelengths of the plurality of Raman pumps of the at least one Raman pump block an amount consistent with the determined amount using the generated control signal.

In another embodiment of the present invention an apparatus includes a memory for storing program instructions and information, such as gain profiles, and a processor for executing the instructions to configure the apparatus to perform the steps of determining a gain profile of an optical signal transported via a first Raman amplification span in a Raman-amplified WDM system, comparing the determined gain profile to a gain profile of an optical signal transported via a second Raman amplification span, determining from the comparison, an amount of wavelength adjustment required for a plurality of Raman pumps comprising at least one Raman pump block of the second Raman amplification span to alter the gain profile of an optical signal transported via the second Raman amplification span, such that a cumulative gain profile of an optical signal transported via the first and the second Raman amplification spans approaches a desired gain profile, and generating a control signal suitable for adjusting the wavelengths of the plurality of Raman pumps of the at least one Raman pump block an amount consistent with the determined amount.

Alternatively, the apparatus is further configured to adjust, substantially simultaneously, the wavelengths of the plurality of Raman pumps of the at least one Raman pump block an amount consistent with the determined amount.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be described within the context of an all-Raman-pumped WDM system. However, it will be appreciated by those skilled in the art that the subject invention may be advantageously employed in any system utilizing at least one wavelength tunable Raman pump. The subject invention may also be advantageously employed in a hybrid systems comprising at least one wavelength tunable Raman pump as well as non-Raman optical pumps or sources.

Figure 1:
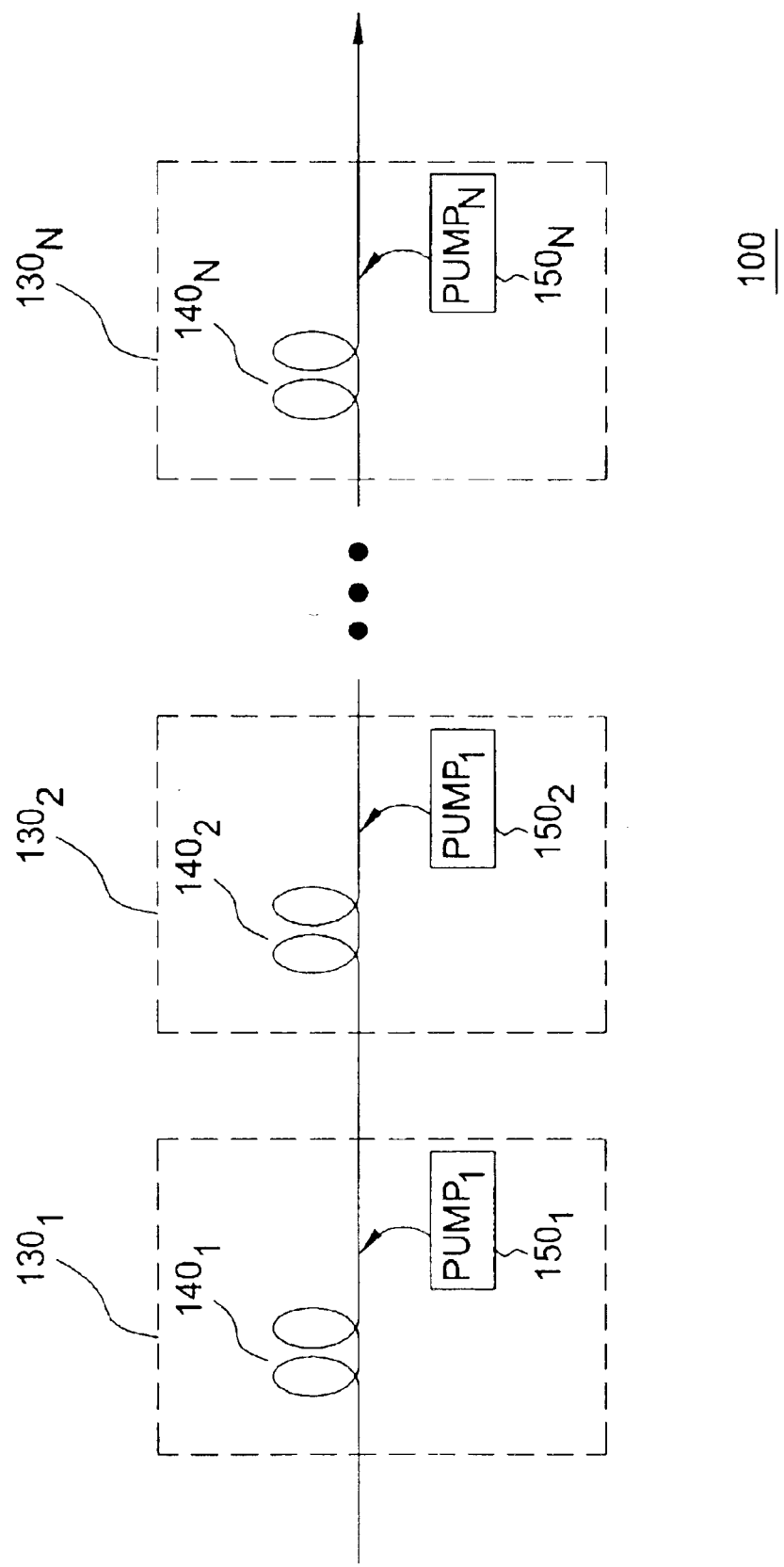
FIG. 1 depicts a high-level block diagram of a plurality of concatenated Raman amplification spans of an all-Raman-pumped wavelength-division-multiplexed (WDM) system.

FIG. 1 depicts a high-level block diagram of a plurality of concatenated Raman amplification spans of an all-Raman-pumped wavelength-division-multiplexed (WDM) system 100. The all-Raman-pumped WDM system 100 of FIG. 1 comprises a plurality of Raman amplification spans $130_1$–$130_N$ (collectively Raman amplification spans 130). Each of the Raman amplification spans 130 comprises a respective amplification fiber $140_1$–$140_N$ (collectively amplification fibers 140, illustratively standard transmission fibers) and a respective Raman pump block $150_1$–$150_N$ (collectively Raman pump blocks 150). Each Raman pump block 150 of the all-Raman-pumped WDM system 100 of FIG. 1 comprises a plurality of pumps (not shown) with varied wavelengths acting collectively. The plurality of pumps of the Raman pump block $150_2$ though, are tunable Raman pumps. Pump light from each of the Raman pump blocks 150 is transmitted in the backwards direction to ump its respective fiber span 140. Signals in the fiber spans 140 are therefore amplified by Raman gain.

Figure 2:
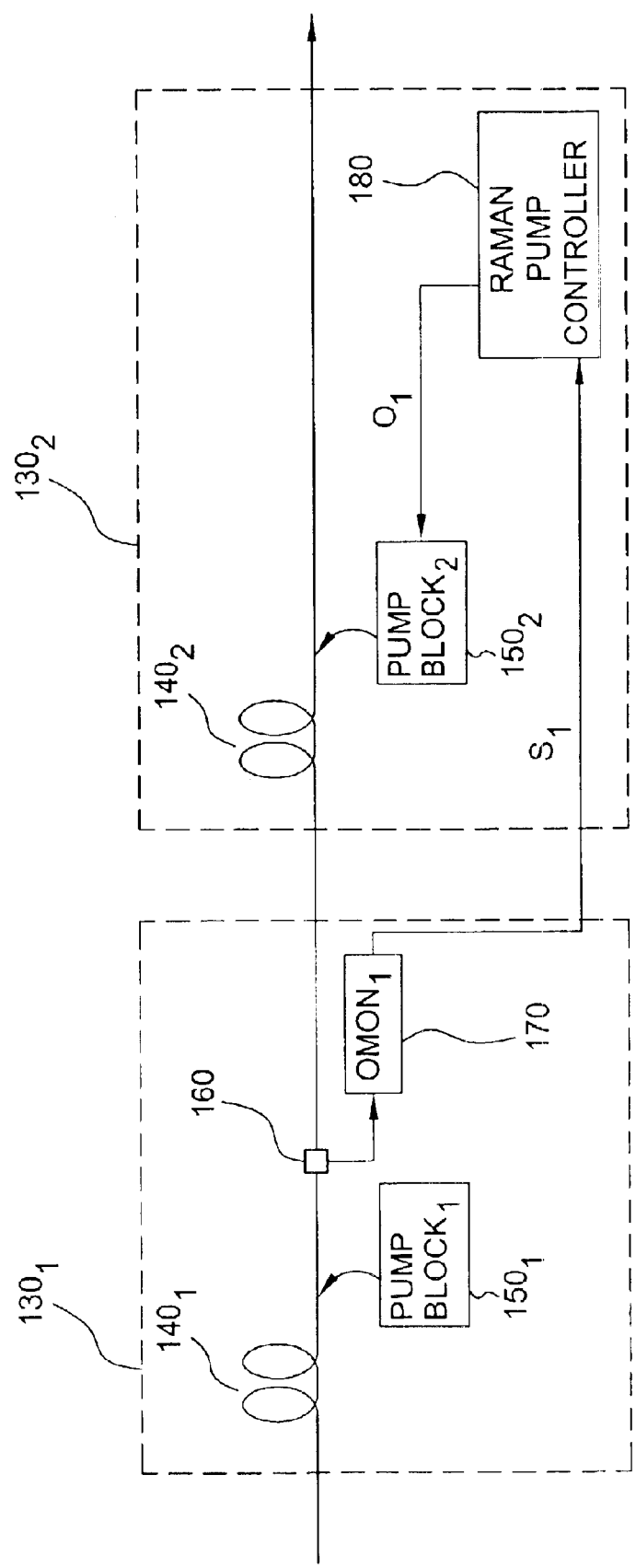
FIG. 2 depicts a high-level block diagram of two concatenated Raman amplification spans of the all-Raman-pumped WDM system of FIG. 1, including an embodiment of the present invention.

FIG. 2 depicts a high-level block diagram of two concatenated Raman amplification spans (illustratively Raman amplification spans $130_1$ and $130_2$) of the all-Raman-pumped WDM system 100 of FIG. 1, including an embodiment of the present invention. The two concatenated Raman amplification spans $130_1$ and $130_2$ of FIG. 2 are substantially identical. The Raman amplification spans $130_1$, $130_2$ of FIG. 2 each comprise an amplification fiber (illustratively a 100 km standard transmission fiber) $140_1$ and $140_2$ and a corresponding Raman pump block $150_1$ and $150_2$, respectively. The Raman amplification span $130_1$ further includes a tap $160_1$ and a detector (illustratively an optical channel monitor (OMON)) 170. The Raman amplification span $130_2$ further includes a Raman pump controller 180.

Although in the illustrative embodiment of the present invention of FIG. 2 the tap $160_1$ and the OMON 170 are depicted as being located directly after the Raman amplification fiber $140_1$, it will be appreciated by those skilled in the arts armed with the teachings of the present invention that in an alternate embodiment, the tap $160_1$ can be located further along the amplification span $130_1$ and further away from the Raman amplification fiber $140_1$. In addition, although the Raman pump controller 180 is depicted as being located within the Raman amplification span $130_2$, it will be appreciated by those skilled in the relevant art that within the teachings of the present invention, the Raman pump controller 180 can be located in another span or in a remote location. Moreover, although in FIG. 2 the components comprising the Raman amplification span $130_1$ are depicted as specific components, other components performing substantially similar functions as those components depicted in FIG. 2 can be substituted within the concepts of the present invention. For example, the detectors can be optical spectrum analyzers (OSAs) and the like, and the taps can be beam splitters and the like.

Optical signals entering the Raman amplification span $130_1$ are amplified in the Raman amplification fiber $140_1$ by the Raman pump block $150_1$. A portion of the amplified optical signals are then tapped by the tap $160_1$ and communicated to the OMON 170. The OMON 170 takes measurements of the spectral properties of the optical signal and communicates the measured data to the Raman pump controller 180 of the Raman amplification span $130_2$. The measured data from the OMON 170 includes data reflecting signal powers, pump wavelengths, and other system parameters. The Raman pump controller 180 utilizes the measured data from the OMON 170 to determine a gain profile of the Raman amplification span $130_1$. The remaining optical signals in the Raman amplification span $130_1$ continue to the Raman amplification span $130_2$. In the Raman amplification span $130_2$ the optical signals are amplified in the Raman amplification fiber $140_2$ by the tunable Raman pump block $150_2$. The amplified optical signals then propagate to the output of the Raman amplification span $130_2$.

Figure 3:
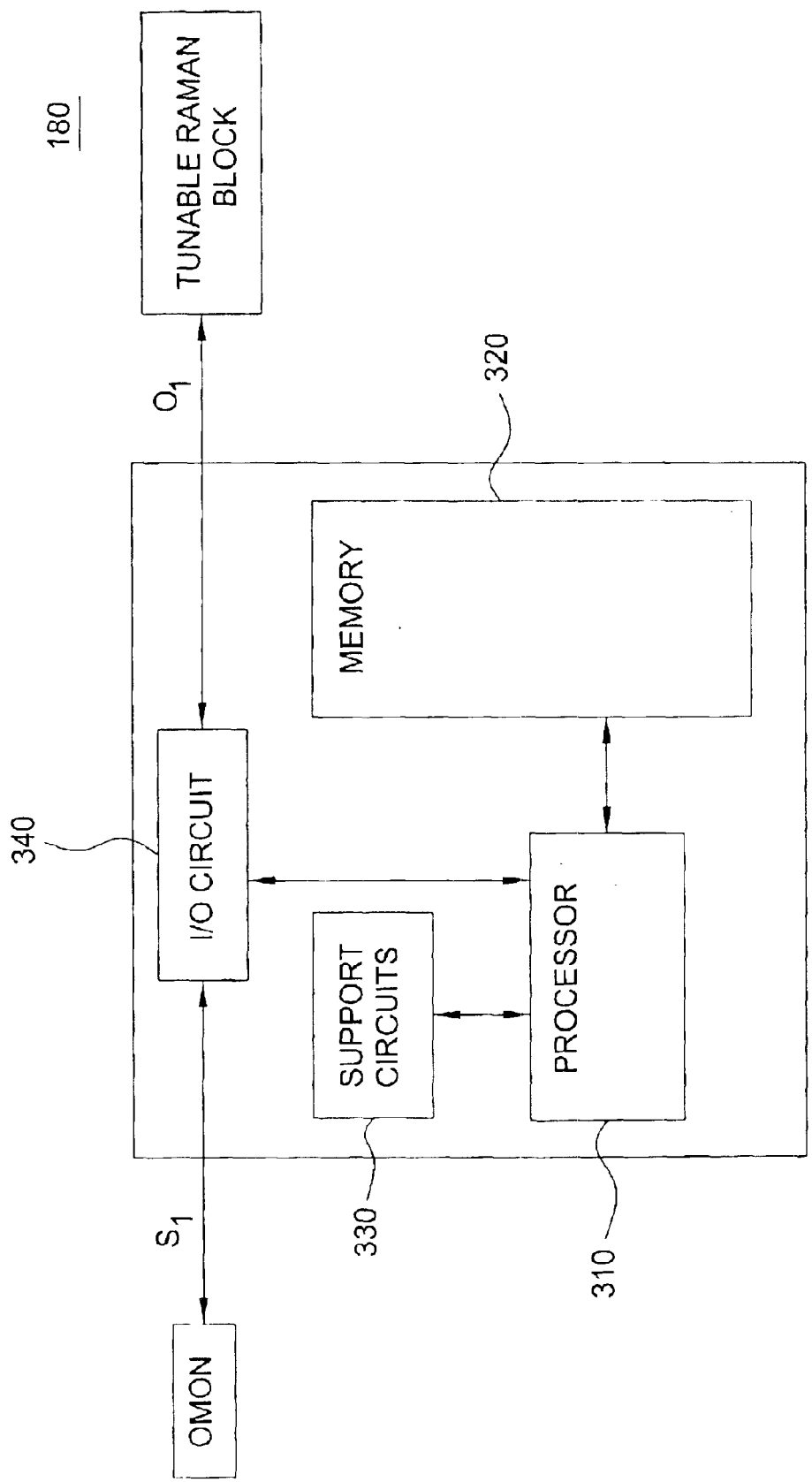
FIG. 3 depicts a high level block diagram of an embodiment of a Raman pump controller suitable for use in a Raman amplification span of FIG. 2.

FIG. 3 depicts a high level block diagram of an embodiment of a Raman pump controller 180 suitable for use in the Raman amplification span $130_2$ of FIG. 2. The Raman pump controller 180 of FIG. 3 comprises a processor 310 as well as a memory 320 for storing information and control programs. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. Raman pump controller 180 also contains input-output circuitry 340 that forms an interface between the various functional elements communicating with the Raman pump controller 180. For example, in the embodiment of FIG. 2, the Raman pump controller 180 communicates with the OMON 170 via a signal path S1 and to the tunable Raman pump block $150_2$ via signal path O1.

Although the Raman pump controller 180 of FIG. 3 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, firmware, hardware, or a combination thereof.

Referring back to FIG. 2, the Raman pump controller 180 of the Raman amplification span 130$_2$ compares the determined gain profile of the Raman amplification span 130$_1$ to an expected gain profile of the Raman amplification span 130$_2$ (e.g., in this embodiment the gain profile of the Raman amplification fiber 140$_2$) stored in the memory 320 of the Raman pump controller 180. The Raman pump controller 180 utilizes the comparison to calculate how much the stored expected gain profile of the Raman amplification span 130$_2$ needs to be shifted in wavelength to mitigate (reduce) the gain ripple of the Raman amplification span 130$_1$ or of subsequent Raman amplification spans. That is, the gain profiles (gain ripple profiles) of the Raman amplification spans 130$_1$, 130$_2$ are compared (i.e., overlayed) to determine how much the pumps of the Raman pump block 150$_2$ need to be adjusted to alter the gain profile of the Raman amplification span 130$_2$ to approach a desired resultant cumulative gain profile of the Raman amplification span 130$_1$ and the Raman amplification span 130$_2$. For example, in one embodiment of the present invention, a desired resultant cumulative gain profile of the Raman amplification span 130$_1$ and the Raman amplification span 130$_2$ may comprise a substantially flat gain profile. As such, the wavelengths of the pumps of the Raman pump block 150$_2$ are adjusted an amount necessary to alter the gain profile of the Raman amplification span 130$_2$ to substantially cancel the gain ripple of the Raman amplification span 130$_1$ or reduce the cumulative gain ripple of the Raman amplification span 130$_1$ and the Raman amplification span 130$_2$ to a minimum, thus producing a relatively flat gain profile at the output of the Raman amplification span 130$_2$. (In the case of identical concatenated spans, a wavelength shift can be calculated for a subsequent Raman amplification span to substantially cancel the gain ripple of a previous Raman amplification span).

In an alternate embodiment of the present invention, a desired resultant cumulative gain profile of the Raman amplification span 130$_1$ and the Raman amplification span 130$_2$ may comprise a gain profile necessary to correct for gain ripples in the gain profiles of subsequent Raman amplification spans. For example, a resultant cumulative gain profile of the Raman amplification span 130$_1$ and the Raman amplification span 130$_2$ may be configured to compensate for a gain ripple of any single one or any combination of the subsequent Raman amplifications spans 130$_3$–130$_N$ of the all-Raman-pumped wavelength-division-multiplexed (WDM) system 100 of FIG. 1 (i.e., precompensation). In this embodiment, the desired resultant gain profile is predetermined from information regarding the subsequent Raman amplification spans (i.e., a detector in a subsequent span determines the gain profile of a subsequent Raman amplification span(s) and communicates that information to the Raman pump controller 180) and stored in the Raman pump controller 180. The wavelengths of the pumps of the Raman pump block 150$_2$ are then substantially simultaneously adjusted to alter the gain profile of the Raman amplification span 130$_2$, such that when combined with the gain profile of the Raman amplification span 130$_1$ produce the desired resultant gain profile at the output of the Raman amplification span 130$_2$.

After calculating the wavelength shift necessary for the gain profile of the Raman amplification span 130$_2$ to produce the desired resultant cumulative gain profile of the Raman amplification span 130$_1$ and the Raman amplification span 130$_2$, the Raman pump controller 180 then sends a control signal to the tunable pumps of the tunable Raman pump block 150$_2$ to adjust the wavelengths of all of the pumps simultaneously an amount consistent with the calculated amount to approach the desired resultant cumulative signal gain profile. As previously described, the desired resultant cumulative gain profile may comprise a substantially flat gain profile or other gain profiles used for precompensation of subsequent Raman amplification spans to mitigate the effects of gain ripple. Although in the embodiment presented above, the Raman pump controller 180 directly adjusts the wavelengths of the pumps of the Raman pump block 150$_2$, it will be appreciated by those skilled in the art armed with the teachings of the present invention, that in alternate embodiments of the present invention, the Raman pump controller of the present invention may instead simply generate a control signal suitable for use by other control means for adjusting the wavelengths of the pumps of a Raman pump block in accordance with the present invention. For example, the pumps of a Raman pump block may comprise a control means within the pumps themselves to adjust the wavelengths when a control signal is applied.

Once again and referring to the embodiment of the present invention of FIGS. 1, 2 and 3, the Raman pump controller 180 utilizes the determined gain profile of the Raman amplification span 130$_1$ and the gain profile of the Raman amplification span 130$_2$ stored in the Raman pump controller 180 to determine an amount to responsively adjust the pump wavelengths of the tunable Raman pump block 150$_2$ to approach a desired cumulative gain profile of the Raman amplification spans 130$_1$ and the Raman amplification span 130$_2$. The control function of the exemplary embodiment includes a negative feedback loop that automatically adjusts the wavelengths of the pumps of the tunable Raman pump block 150$_2$ based on a comparison of the gain profiles of the Raman amplification span 130$_1$ and the Raman amplification span 130$_2$.

Specifically, in one embodiment of the present invention, the Raman pump controller 180 fits (or matches) the gain profile of the Raman amplification span 130$_1$ to a sine function, whose period in wavelength is considered by the inventors as $\Delta\lambda_{period}$. The Raman pump controller 180 then determines the location in wavelength of a first gain peak in the gain profile of the Raman amplification span 130$_1$, which is considered by the inventors as $\lambda_{peak\,1}$. If the first signal peak wavelength $\lambda_{peak\,1}$ is longer than a shortest signal wavelength $\lambda_1$ of the stored expected gain profile of the Raman amplification span 130$_2$ by more than half of $\Delta\lambda_{period}$ (e.g., $\Delta\lambda_{peak\_1} > \lambda_1 + \Delta\lambda_{period}/2$), then all the pump wavelengths of the tunable Raman pump block 150$_2$ are shifted by $+\Delta\lambda_{period}/2$. On the other hand, when $\Delta\lambda_{peak\_1} < \lambda_1 + \Delta\lambda_{period}/2$, then all of the pump wavelengths of the tunable Raman pump block 150$_2$ are shifted by $-\Delta\lambda_{period}/2$.

As described above, the control algorithm is very simple, fast, and reliable. Furthermore, since the shift of pump wavelength is done simultaneously for all the pumps, the implementation of such Raman gain optimization is simple, and very cost-effective. In an alternate embodiment, the pump wavelengths can be simply shifted by changing the temperature of an entire Raman pump block containing all of the pumps.

In the embodiment of the present invention of FIGS. 1, 2 and 3 above, if subsequent iterations are to be performed, the wavelength adjustment of the pumps of the Raman pump block $150_2$ must be taken into account. That is, because the pumps of the Raman pump block $150_2$ were adjusted, the gain profile of the Raman amplification span $130_2$ is changed and the previously stored gain profile for the Raman amplification span $130_2$ is no longer current. As such the Raman pump controller 180 must take into account the wavelength adjustment of the pumps of the Raman pump block $150_2$ in subsequent iterations. In one embodiment of the present invention, the Raman pump controller 180 calculates and stores a new gain profile for the Raman amplification span $130_2$ between iterations. In an alternate embodiment of the present invention, the Raman pump controller 180 stores the information regarding the amount and direction of the wavelength adjustment to the pumps of the Raman pump block $150_2$ and subtracts that amount from any subsequent wavelength adjustments calculated.

The sampling rate and processing rate of the OMON 170 and the Raman pump controller 180 can be configured to provide a wide range of update frequencies according to the sensitivity desired in the system. For example, the iterations of the OMON 170 and the Raman pump controller 180 can be configured to run continuously or at a similar rate as the bit rate of the propagating optical signals in a system. The invention can be advantageously implemented in a wide range of update frequencies, limited only by the actual components used. The Raman pump controller 180 can also be configured to provide a wide range of scaling factors to be applied to the control signal to the tunable Raman pump block $150_2$. For example, the wavelengths of the pumps of the tunable Raman pump block $150_2$ can be incremented or decremented by the Raman pump controller 180 in fractions of the total tunable wavelength range of the pumps of the tunable Raman pump block $150_2$.

In the all-Raman-pumped WDM system 100 of FIG. 1, the plurality of Raman amplification spans $130_1$–$130_N$ may be configured such that the gain ripples in a signal gain profile generated in a specific Raman amplification span can be reduced in a directly subsequent span, as described above, or can be reduced, along with gain ripples produced within any intermediate Raman amplification spans, in a later span or spans of the all-Raman-pumped WDM system 100. As such, the plurality of Raman amplification spans $130_1$–$130_N$ may be configured to reduce the gain ripples produced within a specific span in alternating spans, every third span or other combinations of spans within the concepts of the present invention.

Figure 4A:
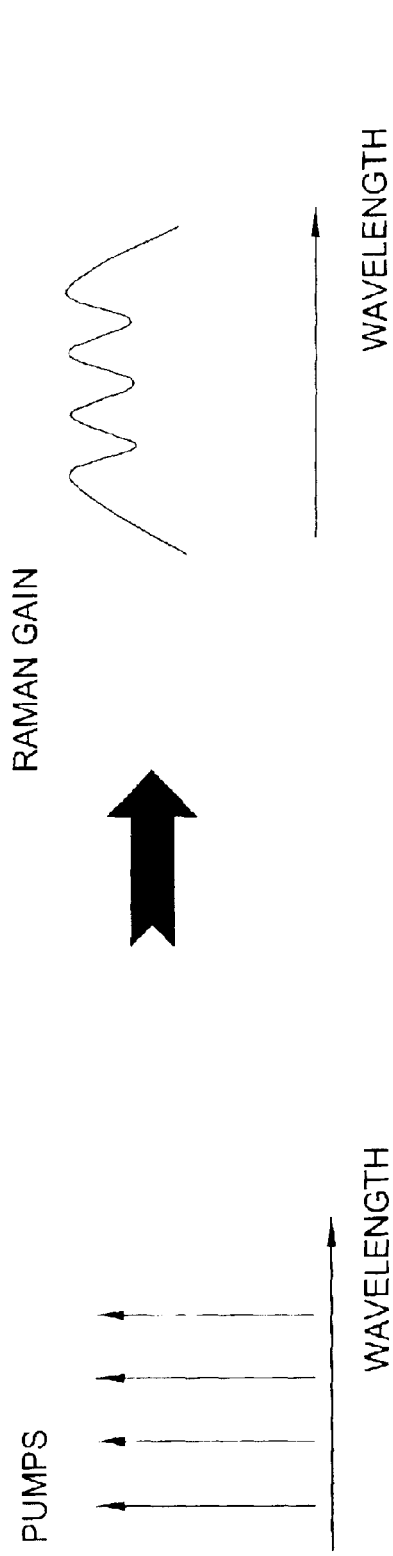
FIG. 4a graphically depicts an exemplary arrangement of the pumps of the Raman pump block of the first Raman amplification span and a gain profile of the first Raman amplification span of FIG. 2 containing gain ripple.

FIG. 4a graphically depicts an exemplary arrangement of the pumps of the Raman pump block $150_1$ and a gain profile of the Raman amplification span $130_1$ containing gain ripple. The gain ripple depicted in FIG. 4a is caused by the use of the plurality of pumps with varied wavelengths acting collectively as the Raman pump block $150_1$. The different pump wavelengths of the Raman pump block $150_1$ generate gain curves having different gain maxima thereby, when combined, creating an uneven gain signal.

Figure 4B:
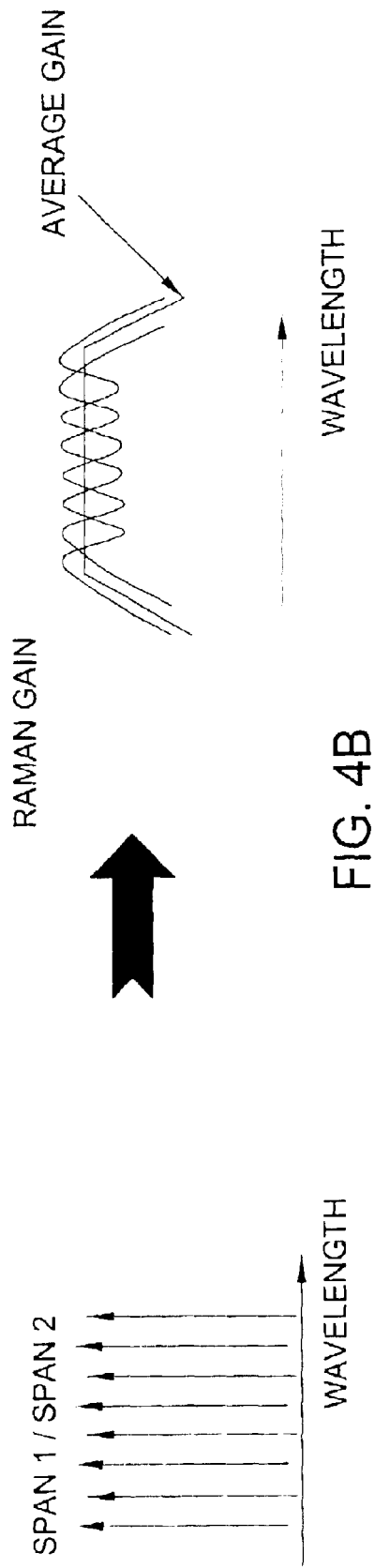
FIG. 4b graphically depicts an exemplary arrangement of the pumps of the second Raman pump block, a gain profile of FIG. 3a superimposed with a gain profile of the second Raman amplification span, and an average gain after an adjustment of the wavelengths of the pumps of the tunable Raman pump block by the Raman pump controller.

FIG. 4b graphically depicts an exemplary arrangement of the pumps of the Raman pump block $150_2$, a gain profile of FIG. 3a superimposed with a gain profile of the Raman amplification span $130_2$, and an average gain after an adjustment of the wavelengths of the pumps of the tunable Raman pump block $150_2$ by the Raman pump controller 180. As evident in FIG. 4b, because the Raman amplification span $130_1$ and the Raman amplification span $130_2$ are substantially identical, the gain profiles of both of the Raman amplification spans $130_1$, $130_2$ are substantially identical. Therefore, by adjusting the wavelengths of the pumps of the tunable Raman pump block $150_2$ in the Raman amplification span $130_2$, the resultant average gain profile of the Raman amplification spans $130_1$, $130_2$ can be made substantially flat.

Figure 5:
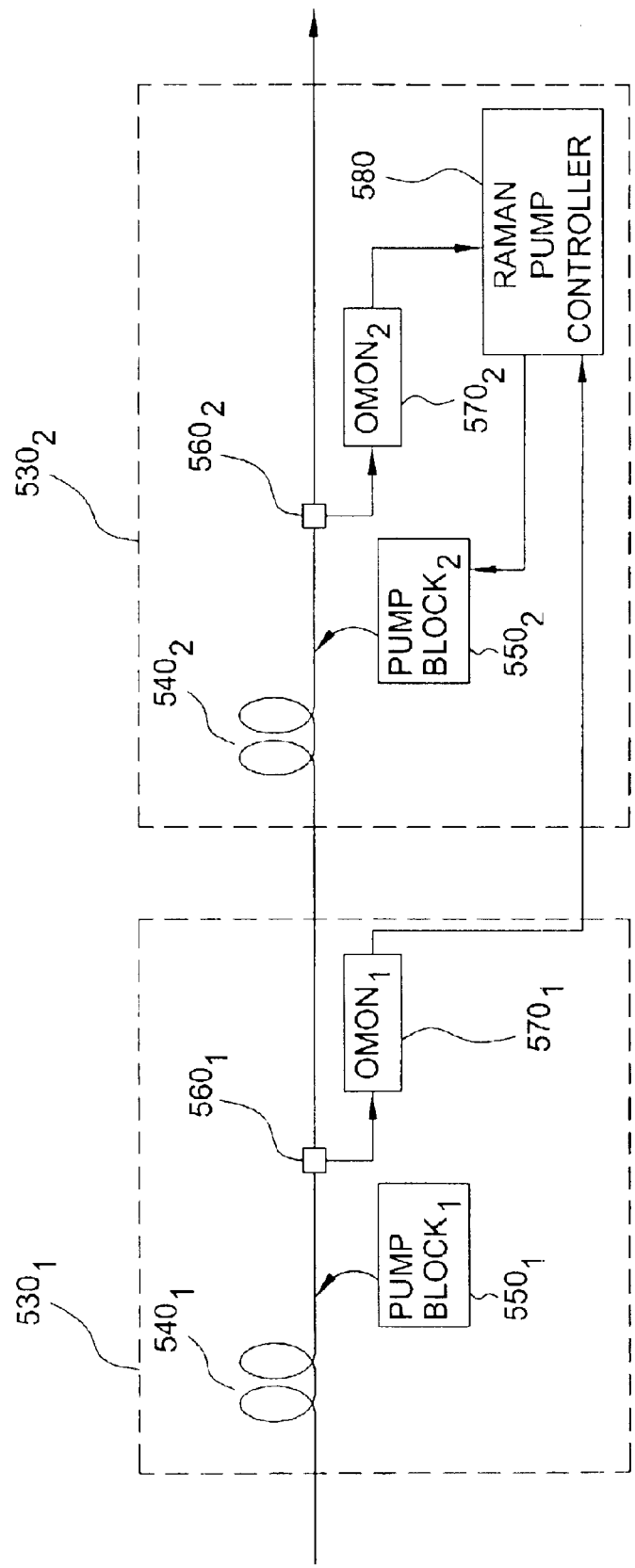
FIG. 5 depicts an alternate embodiment of the present invention.

FIG. 5 depicts an alternate embodiment of the present invention. FIG. 5 depicts a high-level block diagram of two concatenated Raman amplification spans $530_1$ and $530_2$ including an embodiment of the present invention. The two concatenated Raman amplification spans $530_1$ and $530_2$ of FIG. 5 are substantially identical. The Raman amplification spans $530_1$, $530_2$ of FIG. 5 each comprise an amplification fiber (illustratively a 100 km amplification fiber) $540_1$ and $540_2$ and a corresponding Raman pump block $550_1$ and $550_2$, respectively. The Raman pump blocks $550_1$ and $550_2$ each comprise a plurality of pumps with varied wavelengths acting collectively. The plurality of pumps of the Raman pump block $550_2$ though, are tunable Raman pumps. Pump light from the Raman pump blocks $550_1$ and $550_2$ is transmitted in the backwards direction to pump its respective fiber span $540_1$ and $540_2$. Signals in the fiber spans $540_1$ and $540_2$ are therefore amplified by Raman gain.

In addition to the components listed above, Raman amplification span $530_1$ further includes a tap $560_1$ and a detector (illustratively an optical channel monitor (OMON)) $570_1$. Raman amplification span $530_2$ further includes a tap $560_2$, a detector (illustratively an optical channel monitor (OMON)) $570_2$, and a Raman pump controller 580. Optical signals entering the Raman amplification span $530_1$ are amplified in the Raman amplification fiber $540_1$ by the Raman pump block $550_1$. A portion of the amplified optical signals are then tapped by the tap $560_1$ and communicated to the OMON $570_1$. The OMON $570_1$ takes measurements of the spectral properties of the optical signals and communicates the measured data to the Raman pump controller 580 of the Raman amplification span $530_2$. The measured data from the OMON $570_1$ includes data reflecting signal powers, pump wavelengths, and other system parameters. The Raman pump controller 580 utilizes the measured data from the OMON $570_1$ to determine a gain profile of the Raman amplification span $530_1$. The remaining optical signals in the Raman amplification span $530_1$ propagate to the Raman amplification span $530_2$. In the Raman amplification span $530_2$ the optical signals are amplified in the Raman amplification fiber $540_2$ by the tunable Raman pump block $550_2$. A portion of the amplified optical signals are then tapped by the tap $560_2$ and communicated to the OMON $570_2$. The OMON $570_2$ takes measurements of the spectral properties of the optical signals tapped by the tap $560_2$ and communicates the measured data to the Raman pump controller 580. The measured data from the OMON $570_2$ includes data reflecting signal powers, pump wavelengths, and other system parameters. The Raman pump controller 580 utilizes the measured data from the OMON $570_2$ to determine a cumulative gain profile of the Raman amplification span $530_1$ and the Raman amplification span $530_2$. The amplified optical signals in the Raman amplification span $530_2$ then propagate to the output of the Raman amplification span $530_2$.

The Raman pump controller 580 of the embodiment of the present invention of FIG. 5 operates substantially identically to the Raman pump controller 180 of FIG. 1, FIG. 2 and FIG. 3 described above. That is, the Raman pump controller 580 compares the determined gain profile of the Raman amplification span $530_1$ to an expected gain profile of the Raman amplification span $530_2$ (e.g., in this embodiment the gain profile of the Raman amplification fiber $540_2$) stored in a memory of the Raman pump controller 580. The Raman pump controller 580 utilizes the comparison, as described above, to calculate how much the gain profile of the Raman amplification span $530_2$ needs to be shifted in wavelength to mitigate (reduce) the gain ripple of the Raman amplification span $530_1$ or of subsequent Raman amplification spans. That is, the gain profiles (gain ripple profiles) of the Raman amplification spans $530_1$, $530_2$ are compared (i.e., overlayed) to determine how much the pumps of the Raman pump block $550_2$ need to be adjusted to alter the gain profile of the Raman amplification span $530_2$ such that when combined with the gain profile of the Raman amplification span $530_1$ approach a desired resultant cumulative gain profile of the Raman amplification span $530_1$ and the Raman amplification span $530_2$.

As described above, after calculating the wavelength shift necessary for the stored gain profile of the Raman amplification span $530_2$ to produce the desired resultant cumulative gain profile of the Raman amplification span $530_1$ and the Raman amplification span $530_2$, the Raman pump controller 580 then sends a control signal to the tunable pumps of the tunable Raman pump block $550_2$ to adjust the wavelengths of all of the pumps simultaneously an amount consistent with the calculated amount to approach the desired resultant cumulative signal gain profile. As previously described, the desired resultant cumulative gain profile may comprise a substantially flat gain profile or other gain profiles used for pre-compensation of subsequent Raman amplification spans to mitigate the effects of gain ripple.

Although in the embodiment presented above, the Raman pump controller 580 directly adjusts the wavelengths of the pumps of the Raman pump block $550_2$, it will be appreciated by those skilled in the art armed with the teachings of the present invention, that in alternate embodiments of the present invention, the Raman pump controller of the present invention may instead simply generate a control signal suitable for use by other control means for adjusting the wavelengths of the pumps of a Raman pump block in accordance with the present invention. For example, the pumps of a Raman pump block may comprise a control means within the pumps themselves to adjust the wavelengths when a control signal is applied.

In addition, in the embodiment of the present invention of FIG. 5, the OMON $570_2$ of the Raman amplification span $530_2$ continues to monitor the output of the Raman amplification fiber $540_2$ and take measurements of the spectral properties of the amplified optical signals and communicates the measured data to the Raman pump controller 580. After the initial control signal from the Raman pump controller 580 effectively changes the wavelengths of the pumps of the tunable Raman pump block $550_2$ causing the gain profile of the Raman amplification span $130_2$ to approach a desired profile, the Raman pump controller 580 sends a control signal to the tunable Raman pump block $550_2$ to increment or decrement the wavelengths of all of the pumps of the tunable Raman pump block $550_2$ in smaller amounts (e.g. 10% increments of the initial wavelength change) to further approach a desired cumulative gain profile of the Raman amplification span $130_1$ and the Raman amplification span $130_2$. The Raman pump controller 580 cycles through multiple iterations of incrementing and decrementing the wavelengths of all of the pumps of the tunable Raman pump block $550_2$, simultaneously, as needed, with each iteration reducing the size of the increment (e.g. reducing the increment by 50% each iteration) until the cumulative gain ripple of the Raman amplification span $530_1$ and the Raman amplification span $530_2$ substantially conforms to a desired resultant cumulative gain profile. The Raman pump controller 580 continues to receive the measured data from the OMON $570_2$ throughout each iteration and determines the cumulative gain profile of the Raman amplification span $530_1$ and the Raman amplification span $530_2$ to evaluate when the desired cumulative gain profile is achieved.

For example, in one embodiment of the present invention, the Raman pump controller 580 continues to adjust the wavelengths of the pumps of the Raman pump block $550_2$ until a substantially flat gain profile is detected by the OMON $570_2$. In an alternate embodiment of the present invention, the Raman pump controller 580 continues to adjust the wavelengths of the pumps of the Raman pump block $550_2$ until a desired gain profile, also stored in the memory of the Raman pump controller 580, is detected by the OMON $570_2$.

The sampling rate and processing rate of the OMON $570_1$ and $570_2$ and the Raman pump controller 580 can be configured to provide a wide range of update frequencies according to the sensitivity desired in the system. For example, the iterations of the OMON $570_1$ and $570_2$ and the Raman pump controller 580 can be configured to run continuously or at a similar rate as the bit rate of the propagating optical signals in a system. The invention can be advantageously implemented in a wide range of update frequencies, limited only by the actual components used. The Raman pump controller 580 can also be configured to provide a wide range of scaling factors to be applied to the control signal to the tunable Raman pump block $550_2$. For example, the wavelengths of the pumps of the tunable Raman pump block $550_2$ can be incremented or decremented by the Raman pump controller 580 in fractions of the total tunable wavelength range of the pumps of the tunable Raman pump block $550_2$. In the embodiment of the present invention of FIG. 5, the control function of the exemplary embodiment includes a negative feedback loop that automatically adjusts the wavelengths of all of the pumps of the tunable Raman pump block $550_2$, simultaneously, based on a comparison of the gain profiles of the Raman amplification span $530_1$ and the Raman amplification span $530_2$.

Figure 6:
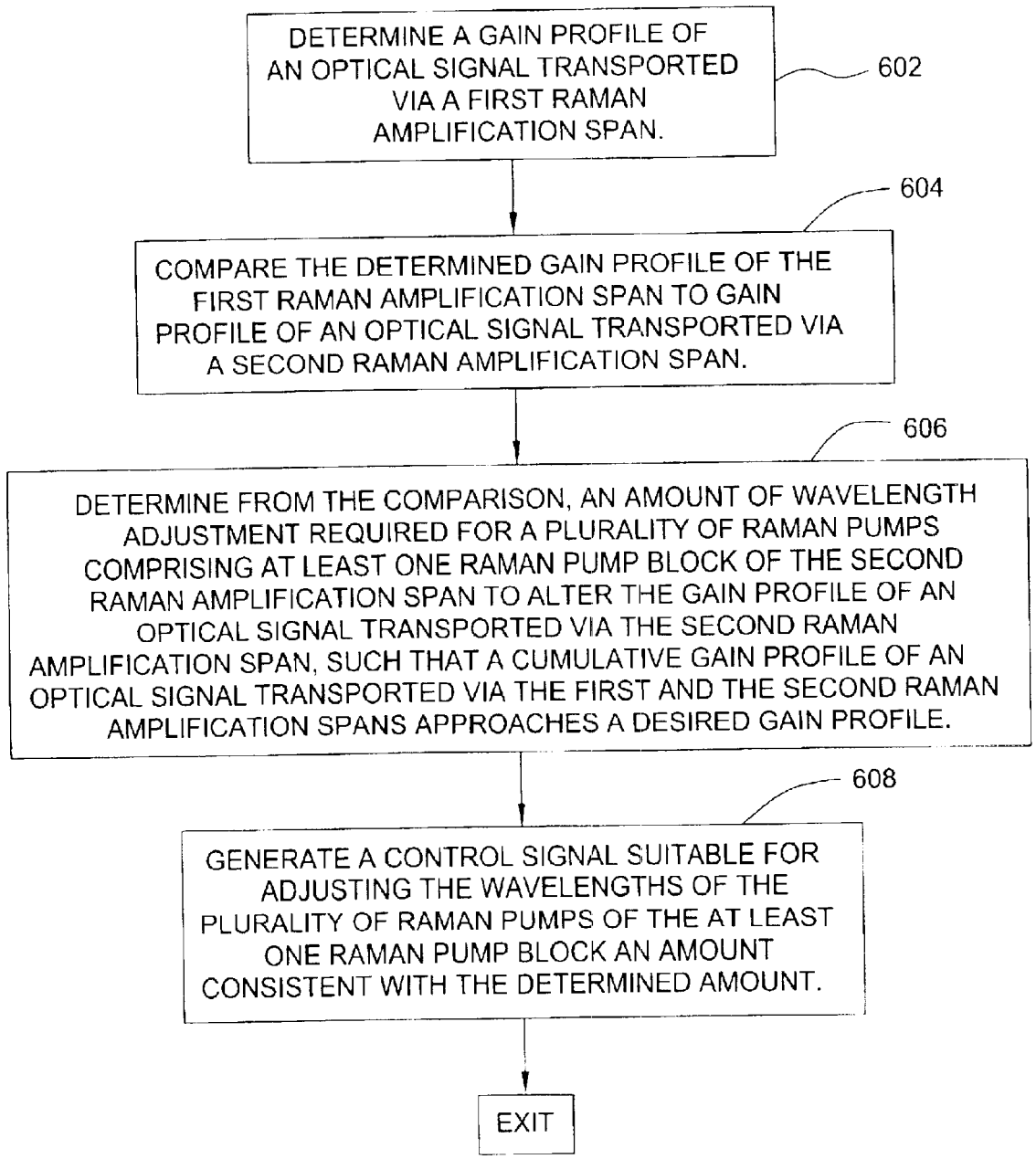
FIG. 6 depicts a flow diagram of one embodiment of a method of the present invention.

FIG. 6 depicts a flow diagram of one embodiment of a method 600 for using gain profiles of a first and a second concatenated Raman amplification spans to calculate an amount of wavelength adjustment required for tunable pumps of a Raman pump block of the second Raman amplification span to alter the gain profile of the second Raman amplification span, such that when combined with the gain profile of the first Raman amplification span approach a desired resultant gain profile for ultimately reducing a cumulative gain ripple.

The method 600 is entered at step 602, wherein a gain profile of an optical signal transported via a first Raman amplification span in a Raman-amplified WDM system is determined. The method then proceeds to step 604.

At step 604, the Raman pump controller compares the determined gain profile of the first Raman amplification span to a gain profile of an optical signal transported via a second Raman amplification span. The method then proceeds to step 606.

At step 606, the Raman pump controller calculates, from the comparison in step 604, an amount of wavelength adjustment required for a plurality of Raman pumps comprising at least one Raman pump block of the second Raman amplification span to alter the gain profile of an optical signal transported via the second Raman amplification span, such that a cumulative gain profile of an optical signal transported via the first and the second Raman amplification spans approaches a desired gain profile. The method then proceeds to step 608.

At step 608, the method 600 generates a control signal suitable for adjusting the wavelengths of the plurality of Raman pumps of the at least one Raman pump block an amount consistent with said determined amount. The method 600 is then exited.

Alternatively, the method 600 can further include step 610. At step 610, the method 600 adjusts, substantially simultaneously, the wavelengths of the plurality of Raman pumps of the at least one Raman pump block an amount consistent with the determined amount and the generated control signal.

Although in the above depicted embodiments of the present invention, the Raman amplification spans were depicted as being substantially identical, the concepts of the present invention can be applied to concatenated Raman amplification spans that are different and produce different Raman gain profiles within at least some of the concatenated Raman amplification spans. For example, a first Raman amplification span may include both, a Raman amplification fiber and a dispersion compensating fiber (DCF), both being pumped by at least one Raman pump block and providing Raman gain for a propagating signal. In this described embodiment, the expected gain profile of a subsequent Raman amplification span can be used to determine how much the stored expected gain profile of the subsequent Raman amplification span needs to be shifted in wavelength to substantially cancel a cumulative gain ripple of the Raman amplification fiber and the DCF of the previous Raman amplification span or substantially reduce the cumulative gain ripple of the previous Raman amplification span and this, subsequent Raman amplification span.

Additionally, the gain ripples produced by a specific Raman amplification span can be reduced in a directly subsequent span, as described above, or can be reduced, along with gain ripples produced by any intermediate Raman amplification spans, in a later concatenated span or spans of a Raman transmission system. As such, a plurality of concatenated Raman amplification spans can be configured to reduce the gain ripples produced in a span in alternating spans, every third span or other combinations of spans within the concepts of the present invention.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   determining a gain ripple profile of an optical signal propagated via a first Raman amplification span in a Raman-amplified WDM system;
   comparing said determined gain ripple profile to a gain profile of a second Raman amplification span;
   determining, from said comparison, an amount of wavelength adjustment required for a plurality of Raman pumps comprising at least one Raman pump block of said second Raman amplification span to alter the gain profile of said second Raman amplification span, such that a cumulative gain profile of an optical signal transported via said first and said second Raman amplification spans approaches a desired gain profile, wherein said desired gain profile is a gain profile tending to reduce the gain ripple of at least said optical signal in said first Raman amplification span; and
   generating a control signal suitable for adjusting the wavelengths of said plurality of Raman pumps of said at least one Raman pump block an amount consistent with said determined amount.

2. The method of claim 1, further comprising:
   adjusting, substantially simultaneously, the wavelengths of said plurality of Raman pumps of said at least one Raman pump block an amount consistent with said determined amount.

3. The method of claim 1, wherein said desired gain profile is a relatively flat gain profile.

4. The method of claim 1, wherein said desired gain profile is a predetermined gain profile.

5. The method of claim 1, further comprising:
   determining a cumulative gain profile of an optical signal transported via said first and said second Raman amplification spans.

6. The method of claim 5, wherein said adjusting is iteratively performed until said cumulative gain profile further approaches said desired gain profile.

7. The method of claim 1, wherein the wavelengths of said plurality of Raman pumps are adjusted by adjusting the temperature of said at least one Raman pump block.

8. The method of claim 1, wherein each Raman pump of said plurality of Raman pumps is a tunable Raman pump.

9. The method of claim 8, wherein the wavelengths of said plurality of Raman pumps are adjusted by tuning the wavelength of said each Raman pump.

10. The method of claim 1, wherein said first Raman amplification span comprises at least one Raman amplification fiber wherein Raman amplification is provided to said optical signal.

11. The method of claim 10, wherein said Raman amplification fiber comprises a standard transmission fiber.

12. The method of claim 1, wherein said first Raman amplification span comprises at least one Raman amplification fiber and at least one dispersion compensating fiber, wherein Raman amplification is provided to said optical signal.

13. The method of claim 12, wherein said gain profile of said optical signal transported via said first Raman amplification span comprises a cumulative gain profile of said at least one Raman amplification fiber and said at least one dispersion compensating fiber.

14. The method of claim 1, wherein said determining an amount of wavelength adjustment, comprises:
   matching the gain profile of said optical signal transported via said first Raman amplification span to a sine function, said sine function having a wavelength period of $\Delta\lambda_{period}$;
   determining the location in wavelength of a first gain peak, $\lambda_{peak\_1}$, in the gain profile of said optical signal transported via said first Raman amplification span;
   adjusting the pump wavelengths of said plurality of Raman pumps by $+\Delta\lambda_{period}/2$, if said first gain peak wavelength, $\lambda_{peak\_1}$, is longer than a first (shortest) gain peak wavelength, $\lambda_1$, of said gain profile of said optical signal transported via said second Raman amplification span by more than half of said sine function's wavelength period, $\Delta\lambda_{period}$; and
   adjusting the pump wavelengths of said plurality of Raman pumps by $\lambda_{period}/2$, if said first gain peak wavelength $\lambda_{peak\_1}$ is shorter than said first gain peak wavelength $\lambda_1$ by more than half of said sine function's wavelength period, $\Delta\lambda_{period}$.

15. The method of claim 1, wherein said gain profile of the optical signal transported via said second Raman amplification span is a stored, predetermined expected gain profile.

16. The method of claim 1, wherein said gain profile of the optical signal transported via said second Raman amplification span is a gain profile determined by a Raman pump controller.

17. An apparatus comprising a memory for storing program instructions and information, such as gain profiles, and a processor for executing said instructions, said apparatus adapted to perform the steps of:
   determining a gain profile of an optical signal propagated via a first Raman amplification span in a Raman-amplified WDM system;
   comparing said determined gain profile to a gain profile of a second Raman amplification span;
   determining, from said comparison, an amount of wavelength adjustment required for a plurality of Raman pumps comprising at least one Raman pump block of said second Raman amplification span to alter the gain profile of said second Raman amplification span, such that a cumulative gain profile of an optical signal transported via said first and said second Raman amplification spans approaches a desired gain profile, wherein said desired gain profile is a gain profile tending to reduce the gain ripple of at least said optical signal in said first Raman amplification span; and
   generating a control signal suitable for adjusting the wavelengths of said plurality of Raman pumps of said at least one Raman pump block an amount consistent with said determined amount.

18. The apparatus of claim 17, further configured to adjust, substantially simultaneously, the wavelengths of said plurality of Raman pumps of said at least one Raman pump block an amount consistent with said determined amount.

19. The apparatus of claim 17, further configured to determining a cumulative gain profile of an optical signal transported via said first and said second Raman amplification spans.

20. The apparatus of claim 17, wherein said gain profile of the optical signal transported via said second Raman amplification span is a predetermined expected gain profile stored in said memory.

21. The apparatus of claim 17 wherein said gain profile of the optical signal transported via said second Raman amplification span is determined by said apparatus.

22. A Raman-amplified WDM system, comprising:
   at least two Raman amplification spans, each span comprising,
      at least one Raman amplification fiber, and
      at least two Raman pumps, comprising at least one Raman pump block, for pumping said at least one Raman amplification fiber,
   a first detector, for measuring the spectral properties of an amplified optical signal in a first Raman amplification span of said at least two Raman amplification spans; and
   a Raman pump controller, adapted for:
      determining a gain profile of an optical signal propagated via said first Raman amplification span using the spectral properties measured by said detector;
      comparing said determined gain profile to a gain profile of a second Raman amplification span of said at least two Raman amplification spans;
      determining, from said comparison, an amount of wavelength adjustment required for said at least two Raman pumps comprising said at least one Raman pump block of said second Raman amplification span to alter the gain profile of said second Raman amplification span, such that a cumulative gain profile of an optical signal transported via said first and said second Raman amplification spans approaches a desired gain profile, wherein said desired gain profile is a gain profile tending to reduce the gain ripple of at least said optical signal in said first Raman amplification span; and
      generating a control signal suitable for adjusting the wavelengths of said at least two Raman pumps of said at least one Raman pump block an amount consistent with said determined amount.

23. The Raman-amplified WDM system of claim 22, wherein said Raman pump controller is further adapted to adjust, substantially simultaneously, the wavelengths of said at least two Raman pumps of said at least one Raman pump block an amount consistent with said determined amount.

24. The Raman-amplified WDM system of claim 22, wherein said first Raman amplification span and said second Raman amplification spans are consecutive, Raman amplification spans.

25. The Raman-amplified WDM system of claim 22, further comprising a second detector for determining a cumulative signal gain profile of an optical signal transported via said first and said second Raman amplification spans.

26. The Raman-amplified WDM system of claim 22, wherein said first Raman amplification span and said second Raman amplification spans are non-consecutive, Raman amplification spans.

27. The Raman-amplified WDM system of claim 26, further comprising a second detector for determining a cumulative signal gain profile of an optical signal transported via said first and said second Raman amplification spans and any intermediate Raman amplification spans.

28. The Raman-ampified WDM system of claim 23, wherein said Raman pump controller is further adapted to determine a cumulative signal gain profile of an optical signal transported via said first and said second Raman amplification spans and any intermediate Raman amplification spans.

29. The method of claim 1, wherein said desired gain profile is a gain profile tending to reduce a total gain ripple of said Raman-amplified WDM system.

* * * * *